United States Patent
Ferdinand et al.

(10) Patent No.: US 8,881,259 B2
(45) Date of Patent: Nov. 4, 2014

(54) NETWORK SECURITY SYSTEM WITH CUSTOMIZABLE RULE-BASED ANALYTICS ENGINE FOR IDENTIFYING APPLICATION LAYER VIOLATIONS

(71) Applicant: Verizon Patent and Licensing Inc., Basking Ridge, NJ (US)

(72) Inventors: Shawn Ferdinand, Allen, TX (US); Jeffrey Allen Haltom, Fishers, IN (US); Rachel Lee Scarbrough, Plano, TX (US); Mark A. Nicholson, Princeton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

(21) Appl. No.: 13/718,189

(22) Filed: Dec. 18, 2012

(65) Prior Publication Data
US 2014/0173712 A1    Jun. 19, 2014

(51) Int. Cl.
*H04L 29/00* (2006.01)
*H04L 29/06* (2006.01)

(52) U.S. Cl.
CPC ...................... *H04L 63/02* (2013.01)
USPC ............. 726/11; 713/155; 713/156; 713/157; 713/158

(58) Field of Classification Search
CPC ................................ H04L 63/20; H04L 67/22
USPC ................................... 713/155–158
See application file for complete search history.

(56) References Cited

U.S. PATENT DOCUMENTS

2005/0240999 A1* 10/2005 Rubin et al. .................... 726/22
2007/0180225 A1*  8/2007 Schmidt ........................ 713/152

\* cited by examiner

*Primary Examiner* — Ghazal Shehni

(57) ABSTRACT

Methods, devices, and storage media storing instructions to obtain logs from a security device and one or multiple service-providing devices, wherein the logs include information pertaining to traffic flow activity at an application layer associated with a service; store rules that identify behavior ranging from unintentional through intentional for one or multiple communication layers including an application layer; interpret the logs based on the rules; determine whether a violation exists based on the interpreting; and generate a notification that indicates the violation exists in response to a determination that the violation exists.

25 Claims, 7 Drawing Sheets

NETWORK SECURITY SYSTEM WITH CUSTOMIZABLE RULE-BASED ANALYTICS ENGINE FOR IDENTIFYING APPLICATION LAYER VIOLATIONS

BACKGROUND

A network security appliance may include firewall capabilities as well as other security capabilities, such as intrusion prevention and virtual private network (VPN) content security. The network security appliance may also provide other security measures, such as anti-virus, anti-spam, anti-phishing, and Uniform Resource Locator (URL) blocking and filtering.

DETAILED DESCRIPTION OF PREFERRED EMBODIMENTS

Figure 1:
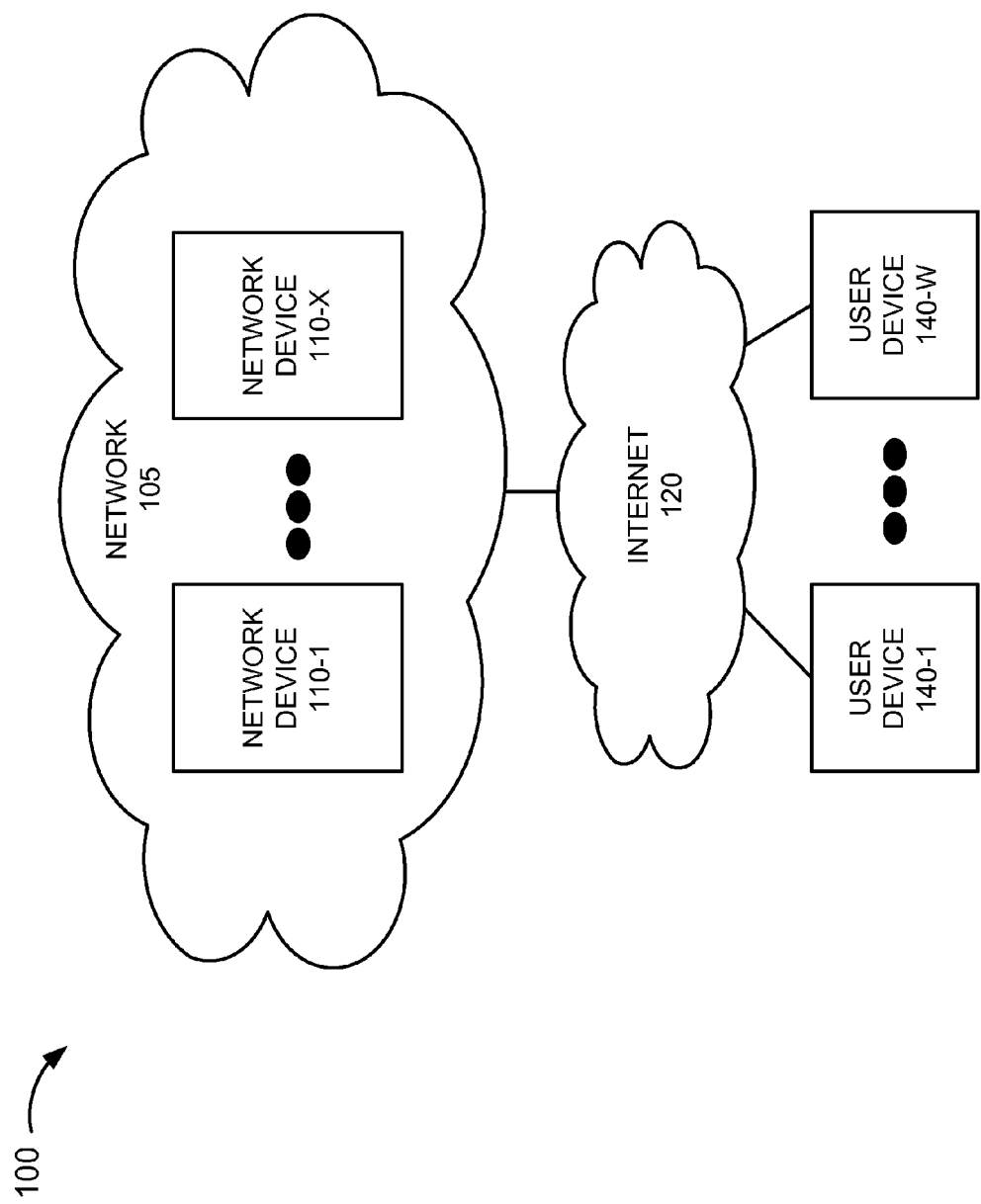
FIG. 1 is a diagram illustrating an exemplary environment in which an exemplary embodiment of a network security system with a customizable rule-based analytics engine may be implemented.

The following detailed description refers to the accompanying drawings. The same reference numbers in different drawings may identify the same or similar elements.

Network security devices or appliances offer various security capabilities to prevent attacks and intrusions. Typically, a network security device attempts to detect or prevent attacks that are malicious. As a result, the network security device may not identify certain behavior as warranting a security response. However, from a service provider perspective, any behavior that unnecessarily uses resources or falls outside a normal threshold of service usage may be deemed as warranting a security response. By way of example, such behavior may stem from an innocent, user device misconfiguration, but nonetheless causes unnecessary usage of a resource. Additionally, network security devices typically provide security for traffic at the lower layers (e.g., layer 2, 3, and 4), while high layer security (e.g., session layer, application layer, etc.) may often be omitted.

According to an exemplary embodiment, a network security system provides security pertaining to a wide range of behavior including non-malicious or unintentional behavior through malicious or intentional behavior. According to an exemplary embodiment, the network security system operates, in part, based on customized rules. The customized rules include rules that target behavior at the application layer. For example, the rules identify a behavior in light of a specific application or service. This is in contrast to other approaches in which network security systems are application-agnostic. In addition, the customized rules include rules that target other layers (e.g., session layer, network layer, lower layers, etc.). As described further below, the network security system allows a network operator to refine the customized rules so as to reduce occurrences of false positives and to target a particular, unwanted behavior. For example, the network security system may be trained based on a feedback loop including operation in the field by the network security system, user evaluation, and rule refinement.

According to an exemplary embodiment, the network security system applies one or multiple rules to identify a behavior or a violation. According to an exemplary embodiment, the network security system generates a score based on the application of the one or more customized rules to any network activity. The contribution of each rule to a score may vary depending on the rule. For example, some rules may be directed to varying degrees of malicious behavior while other rules may be directed to varying degrees of non-malicious behavior. The score may be used to determine whether a violation occurs. Additionally, according to an exemplary implementation, the violation may be categorized as malicious, non-malicious, or other nomenclature corresponding to a type of behavior or degree thereof (e.g., severely malicious, highly unintentional, etc.).

According to an exemplary embodiment, a network security system includes an analytics engine and a security device. According to an exemplary embodiment, the analytics engine receives various type of information (e.g., logs from one or more devices) and applies the customized rules to identify a behavior. According to an exemplary embodiment, the logs include application-level logs. According to an exemplary embodiment, the logs include logs relating to lower-level activity relative to the application layer.

According to an exemplary embodiment, the analytics engine sends an alert to a user (e.g., a network administrator, etc.). The alert informs the user that a violation has occurred. The user may respond in various ways, such as contact a user associated with the unwanted behavior, adjust network settings, or manually configure a blacklist rule on the security device. Alternatively, the analytics engine automatically updates the security device with the blacklist rule. According to this framework, the network security system is dynamic and allows for continuous adjustment to reduce false positives and to train the network security system to identify various levels of threats.

While exemplary embodiments provided in this description may be implemented based on the use of a particular protocol, device, network architecture, platform, etc., such implementations are not intended to be restrictive or provide an exhaustive treatment, as such. In other words, the embodiments described herein may be implemented using other suitable protocols, devices, network architectures, platforms, etc., which may not be specifically described.

FIG. 1 is a diagram illustrating an exemplary environment in which an exemplary embodiment of a network security system with a customizable rule-based analytics engine may be implemented. As illustrated, environment 100 includes a network 105 that includes network devices 110-1 through 110-X (also referred to collectively as network devices 110 or individually as network device 110), Internet 120, and user devices 140-1 through 140-W (also referred to collectively as user devices 140 or individually as user device 140).

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number and type of networks in environment 100 are exemplary and provided for simplicity. For example, according to other implementations, environment 100 may not include Internet 120.

According to other embodiments, a single device in FIG. 1 may be implemented as multiple devices and/or multiple devices may be implemented as a single device. For example, a portion of network devices 110 may be implemented as a single network device 110.

A device may be implemented according to one or multiple network architectures (e.g., a client device, a server device, a peer device, a proxy device, or some combination thereof). A device may be implemented according to a centralized computing architecture, a distributed computing architecture, or a cloud computing architecture.

Also, according to other embodiments, one or more functions and/or processes described as being performed by a particular device may be performed by a different device, or some combination of devices, which may or may not include the particular device.

Environment 100 may be implemented to include wired and/or wireless connections among the devices illustrated. A connection may be direct or indirect and involve intermediary device(s) and/or network(s) not illustrated in FIG. 1. The connections illustrated in FIG. 1 are exemplary.

Network 105 includes one or multiple networks of one or multiple types. For example, network 105 may include a metropolitan area network (MAN), a wide area network (WAN), a packet-switched network, a private network, a wireless network, a wired network, a data network, a public network, or some combination thereof. Network 105 may be associated with a service provider that provides a service or an application.

A portion of network devices 110 include application devices, session border controller devices, and other types of network devices to provide a service. For example, the application devices may include telepresence video communication servers and a communications manager. The session border controller devices may include aggregation services routing functionality, and other network devices 110 may provide communication management functionality, multi-point switching, load balancing, etc., pertaining to the service. Another portion of network devices 110 includes a network security system, as described herein. Internet 120 corresponds to the public Internet.

User device 140 includes a device that allows a user to use the service or the application. For example, with reference to a telepresence video conferencing service, user device 140 includes a display, a microphone, a speaker, a camera, and a user interface. User device 140 may be implemented as a mobile device or a stationary device. According to other exemplary services, user device 140 may be implemented as a computer, a game system, or other suitable device.

Referring to FIG. 1, assume user device 140 initiates a session with a service provided by network 105 via Internet 120. User device 140 may connect to the service via one of network devices 110 (e.g., a network security appliance). After the service is rendered, user device 140 disconnects from network 105.

According to an exemplary embodiment, one of the network devices 110 of the network security system (e.g., an analytics engine) obtains a log pertaining to the session from other network devices 110. For example, the analytics engine obtains a log from the network security appliance and one or more other network devices 110 that provided the service used to the user. By way of example, the log includes information pertaining to session event times, Uniform Resource Indicators (URIs), network addresses (source, destination, network address translation information, etc.), user device type, supported codecs, action(s) performed by the network security appliance, and action(s) performed by one or more of the network devices 110 that provided the service to the user. The logs may be provided to the analytics engine in real-time.

According to an exemplary embodiment, the analytics engine stores customized rules. The analytics engine interprets the logs based on the customized rules. The customized rules include rules that allow the analytics engine to identify unwanted behavior, which may span from non-malicious behavior to malicious behavior. For example, the customized rules include rules pertaining to concurrent events. By way of example, a rule may pertain to X-number of connections to the service from a network address (e.g., an IP address of user device 140) or a subnet. Additionally, for example, the customized rules include rules pertaining to per-time events. By way of example, a rule may pertain to X-number of connections to the service within X time period from a network address or a subnet. Additionally, for example, the customized rules include rules pertaining to entropy in addressing. By way of example, a rule may pertain to entropy of network addresses, such as a first call from a network address of 12345, a second call from a network address of 12346, a third call from a network address of 12347, etc (e.g., low entropy of the network addresses may indicate an attack). Additionally, for example, the customized rules include rules pertaining to aggregated repeat events. While similar to per-time events, the rules are directed to an aggregate versus a sliding-window approach. For example, a rule may be directed to X-number of connections to the service within X time period from a network address or a subnet. By way of further example, the rule may be directed to 200 connections during a 1 day period, whereas a per-time event may be directed to 20 connections during a 5 second time window.

Other examples of customized rules include rules pertaining to IP masking. By way of example, a rule may pertain to the same URI from consecutive IP addresses that within a range in the same subnet. Additionally, for example, the customized rules include rules pertaining to time of day. For example, a rule may pertain to an IP address that is used to access the service only during "off hours." The IP address of the potential attacker may be associated with an enterprise site. The customized rules may also include other types of rules pertaining to other forms of attacks, such as null identity (e.g., a source address that obfuscates identity via random Session Initiation Protocol (SIP) header manipulation), and well-known identity (e.g., use of well-known identities on compromised hosts by using a Sipvicious VoIP tool).

According to an exemplary embodiment, the analytics engine identifies whether a violation occurred during the user's session. For example, the analytics engine calculates a score by applying the customized rules to the logs. If the score is above a threshold score, then the analytics engine determines that a violation occurred. If the score is below a threshold score, then the analytics engine determines that a violation has not occurred. According to an exemplary implementation, the threshold score correlates to a utilization of resources that exceeds a normal usage level or unnecessary resource utilization. For example, unintentional or non-malicious behavior may unnecessarily use resources even though the resource usage is extremely low. Nevertheless, such usage is undesirable to the service provider.

According to an exemplary embodiment, if it is determined that a violation occurred, the analytics engine generates an alert to inform a user (e.g., a network administrator) of the violation. By way of example, the analytics engine may send an e-mail or a text message, may store a file, or provide a user interface that allows the user to become aware of the violation. According to an exemplary embodiment, the analytics engine updates the network security appliance so as to block the network address(es) associated with the session. For example, the analytics engine adds one or multiple entries to a blacklist, which is stored by the network security appliance, to block the user from accessing the service.

Figure 2A:
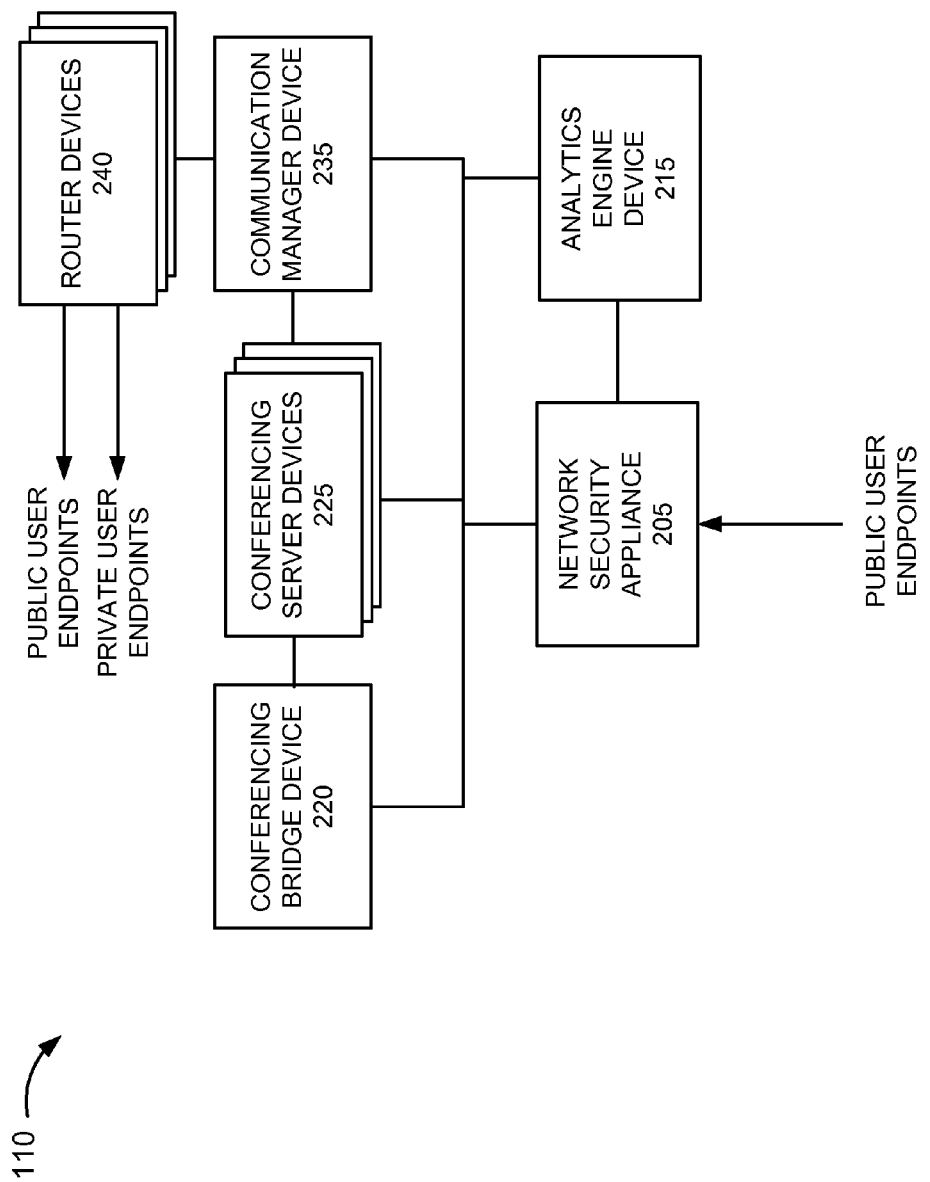
FIG. 2A is a diagram illustrating an exemplary implementation of network devices depicted in FIG. 1.

FIG. 2A is a diagram illustrating an exemplary implementation of network devices 110. For example, network devices 110 include a network security system. The network security system includes a network security appliance 205 and an analytics engine device 215. For example, network security appliance 205 may be implemented as an adaptive security appliance (ASA). Additionally, for example, analytics engine device 215 may be implemented as a computer that includes an analytics engine, as described herein. As illustrated in FIG. 2A, the network security system provides access to a service for public user endpoints. Exemplary network devices 110 that provide the service are described below.

According to an exemplary implementation, network devices 110 include service devices that provide a service. By way of example, network devices 110 include a conferencing bridge device 220, conferencing server devices 225, a communication manager device 235, and router devices 240.

Conferencing bridge device 220 includes a network device that provides bridging services for a multiparty service. For example, conferencing bridge device 220 may be implemented as a video conferencing bridge device or some other type of multipoint control unit suitable for providing a bridge for video conferencing service.

Each of conferencing server devices 225 includes a network device that provides routing. Each of conferencing server devices 225 may be implemented as a video communication server or other suitable device depending on the type of multiparty service (e.g., gaming, etc.). By way of example, each of conferencing server device 225 may be implemented as a private and/or a public video conferencing server device that routes multiparty sessions to private and/or public customer endpoints.

Communication manager device 235 includes a network device that provides communication processing. For example, communication manager device 235 provides session management, voice, video, data, messaging, mobile applications, and web conferencing. Communication manager device 235 may be implemented as a unified communication manager device.

Router devices 240 include network devices that provide routing and edge services. For example, router devices 240 may be implemented as aggregation services routers (ASRs).

Figure 2B:
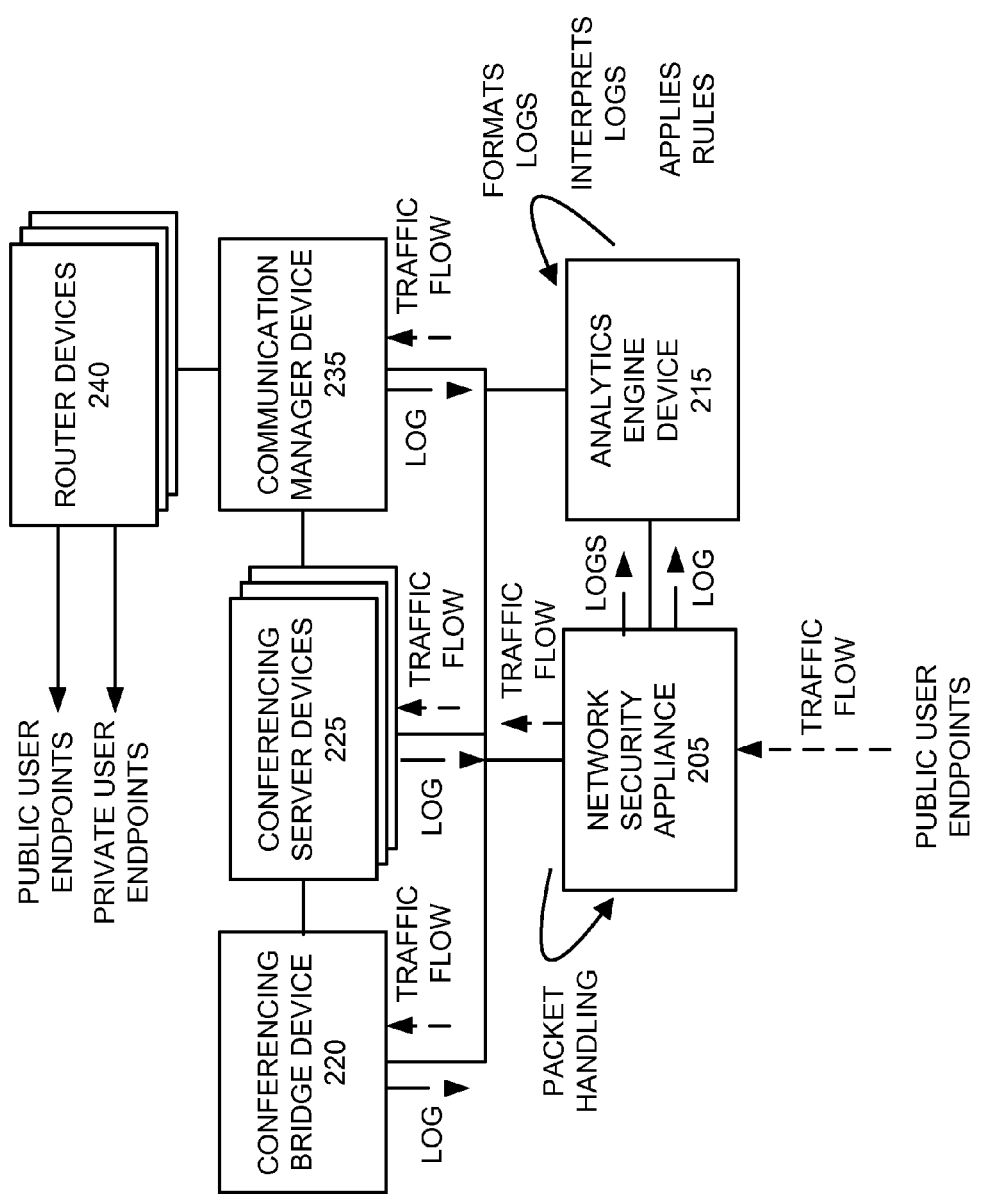
FIGS. 2B and 2C are diagrams illustrating an exemplary process pertaining to the network security system with the customizable rule-based analytics engine.
Figure 2C:
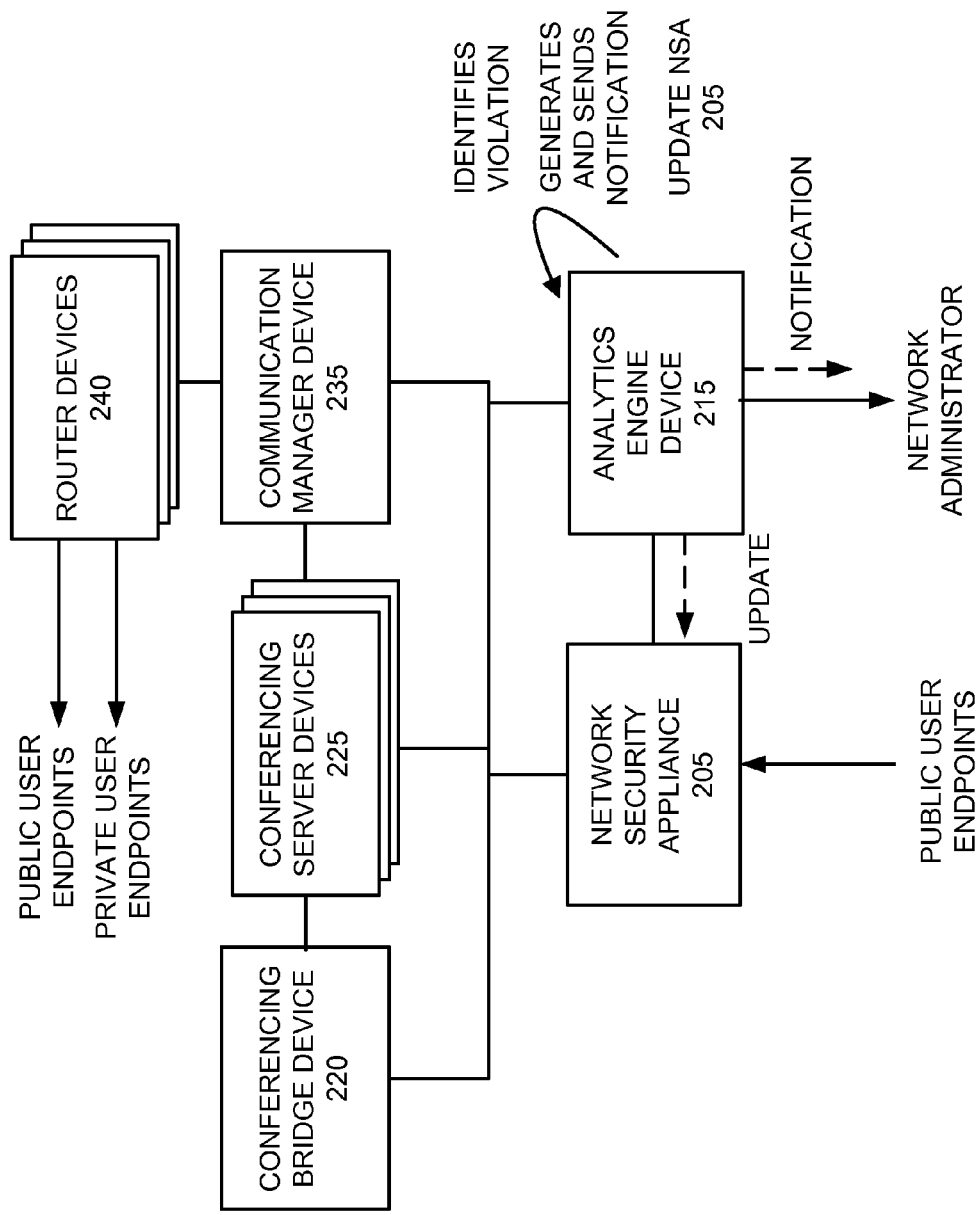

FIGS. 2B and 2C are diagrams illustrating an exemplary process pertaining to the network security system with the customizable rule-based analytics engine. According to this exemplary process, the network security system is capable of providing application layer/service layer protection from non-malicious behavior through malicious behavior and/or another type of behavior.

Referring to FIG. 2B, assume that a public endpoint initiates a traffic flow to use the video conferencing service. The traffic flow includes signaling and media components. Network security appliance 205 performs conventional packet handling (e.g., access control lists (ACLs), firewall, distributed denial of service attacks (DDoS), routing, marking, etc.), as well as providing informational real-time logs to analytics engine device 215. According to an exemplary implementation, analytics engine device 215 includes a log handler. The log handler formats or normalizes log data received. Additionally, as illustrated, conferencing bridge device 220, one of conferencing server devices 225, and communication manager device 235 provide logs to analytics engine device 215 to the extent that the video conferencing service is provided during the session. The log handler also formats or normalizes the log data received from the service-providing devices.

Depending on the device providing a log to analytics engine device 215, the log may include various types of information associated with various layers of traffic flow activity. By way of example, the log may include information pertaining to session event times, dialed URI or digits (e.g., user, host, tags), calling URI or digits (e.g., user, host, tags), network addresses (e.g., source address, destination address, etc.), network address translation information, if present, user device type, supported codecs, action(s) performed by the network security appliance 205, actions performed by network security appliance 205 (e.g., port blocked, etc.), and actions performed by conference bridge device 220, conferencing server device 225, and communication manager device 235 (e.g., incomplete session, invalid session, digits, etc.).

Analytics engine device 215 processes the logs to identify varying degrees of behavior that span from unintentionally or non-malicious behavior through intentional or malicious behavior. Analytics engine device 215 processes the logs based on the customized rules. For example, the customized rules include rules pertaining to a concurrent events, per-times, entropy in addressing, aggregate repeat events, IP masking, time of day, null identity, and well-known identity.

Analytics engine device 215 may use any or all of the data elements provided in the logs and one or multiple customized rules to identify a violation, and in turn, appropriately tailor and/or train network security appliance 205 for desired operation. For example, the desired operation may include the blocking of IP addresses (i.e., IP address blocking) that consume resources within a node or are violating or exceeding a desired application functionality. In contradistinction to well-known security devices (e.g., firewalls, intrusion detection systems (IDSs), DDoS equipment, etc.), network security appliance 205 and analytics engine device 215 provide security based on application-aware and service-specific criteria rather than rules for the purpose of node survival. The network security system may consider and/or secure all resources or specific resources associated with conferencing bridge device 220, conferencing server device 225, and communication manager device 235.

The network security system validates the traffic flow at various layers, including the application layer, so as to protect any resource associated with the video conferencing service from unwanted consumption. Analytics engine device 215 screens the logs against the customized rule set. Analytics engine device 215 interprets the logs in order to make a decision to notify or automate blocking of a particular offending host or IP address.

According to an exemplary implementation, analytics engine device 215 uses timers and counters for each log in order to associate the received logs against a particular IP address, a range of IP addresses, a user identity, a time window, or some other parameter. For example, according to an exemplary implementation, analytics engine device 215 includes a rotating database that stores the timers and the counters and compares them against historical data. Analytics engine device 215 cyclically applies the customized rules against the new historical log data received. Analytics engine device 215 determines whether a violation has occurred.

Referring to FIG. 2C, upon matching a set of criteria (e.g., one or multiple rules) with the log elements, assume that analytics engine device 215 determines that a violation has occurred. In response, analytics engine device 215 generates a notification. For example, analytics engine device 215 may send the notification to a user (e.g., a network administrator) in the form of an e-mail, text message, etc., may store a file accessible to the network administrator, or use some other form of communication. According to an exemplary implementation, the notification includes information indicating an IP address or range of IP addresses identified during the use of the video conferencing service and associated with the violation, a blocking/notification recommendation, a calculated score or a threshold reached, time of event window information and/or time of event information.

In response to receiving the notification, the network administrator may contact the user (e.g., a customer) that is responsible for the violation, adjust network configurations, or manually implement a blacklist rule on network security appliance 205. Alternatively, in response to receiving a command from the network administrator, analytics engine device 215 automatically updates network security appliance 205. For example, analytics engine device 215 updates a blacklist to block an IP address or a range of IP addresses associated with the user.

As previously described, operational feedback from network use of analytics engine device 215 and the customized rules set allows the network administrator to add new rules and/or adjust existing rules, thresholds, etc., to minimize false positives and train the network security system to accurately identify threats and a particular behavior.

Figure 3:
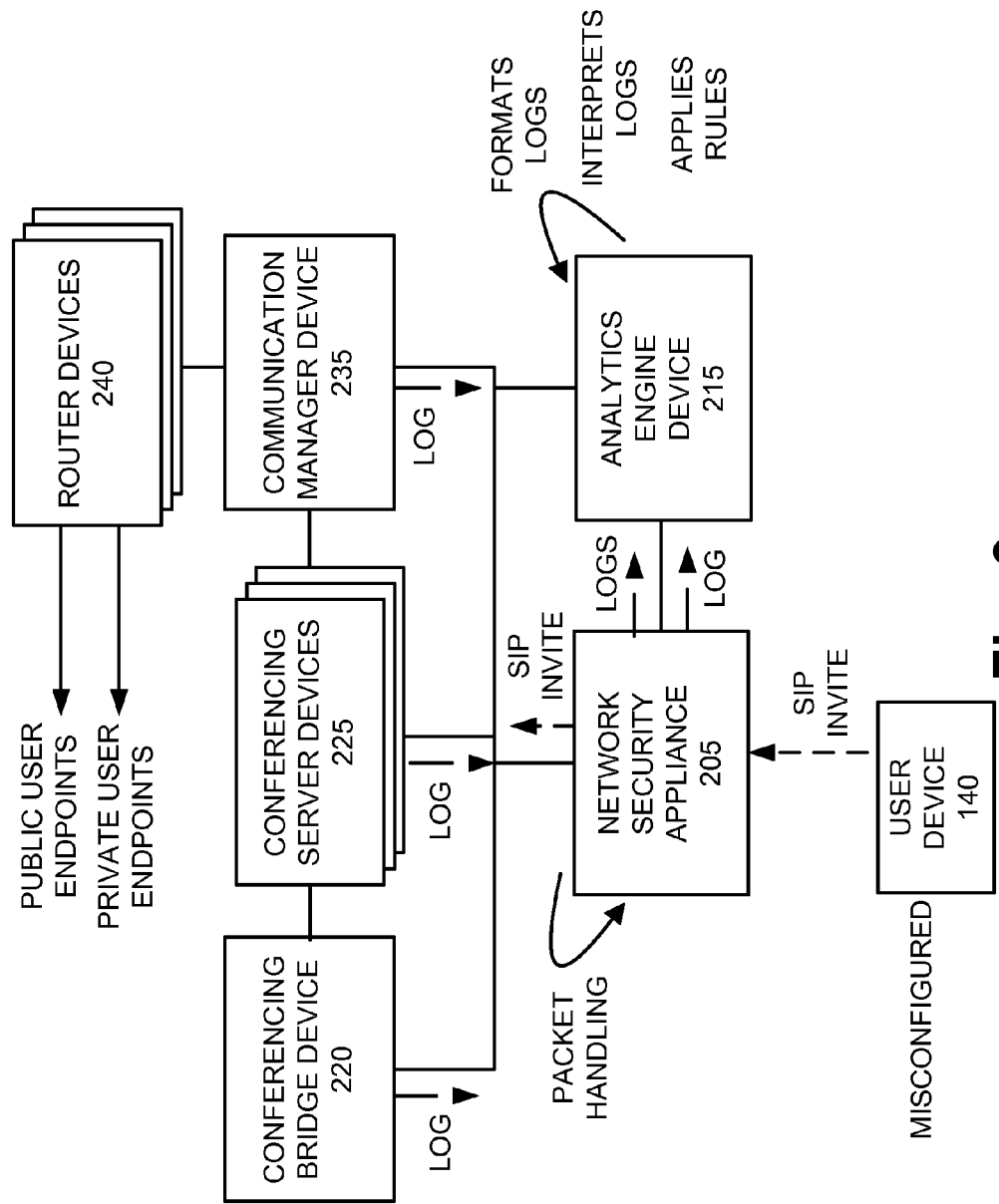
FIG. 3 is a diagram illustrating an exemplary scenario pertaining to the network security system.

FIG. 3 is a diagram illustrating an exemplary scenario. Assume a user of the video conferencing service incorrectly configures user device 140. As a result, user device 140 continuously transmits a session initiation protocol (SIP) invite message once per second via network security appliance 205. Each SIP invite message may be appropriately formatted (e.g., conform to protocol and communication standards). Analytics engine device 215 obtains logs that indicate that the same user device 140 has an increasing number of failed sessions over time. In response, analytics engine device 215 generates a notification that recommends to block or to adjust the IP address routing and/or handling associated with user device 140 because of the repeated failed attempts, the concomitant consumption of resources, and entropy failure validation for user device 140. In response to the notification, a blacklist entry is added to network security appliance 205 to prevent the user from accessing the video conferencing service.

Well-known firewall and DDoS tools may not consider this behavior to meet the "broad burden impact" required by macro tools, such as IDS, firewall, and DDoS suites due to the extremely low transmit rate and proper format of the SIP invite messages. Additionally, firewall and DDoS tools may not consider this behavior as a violation even when the SIP invite messages are coming from multiple sources. Unfortunately, as a result, this type of network activity may go unnoticed and unnecessary usage of resources may occur.

Figure 4:
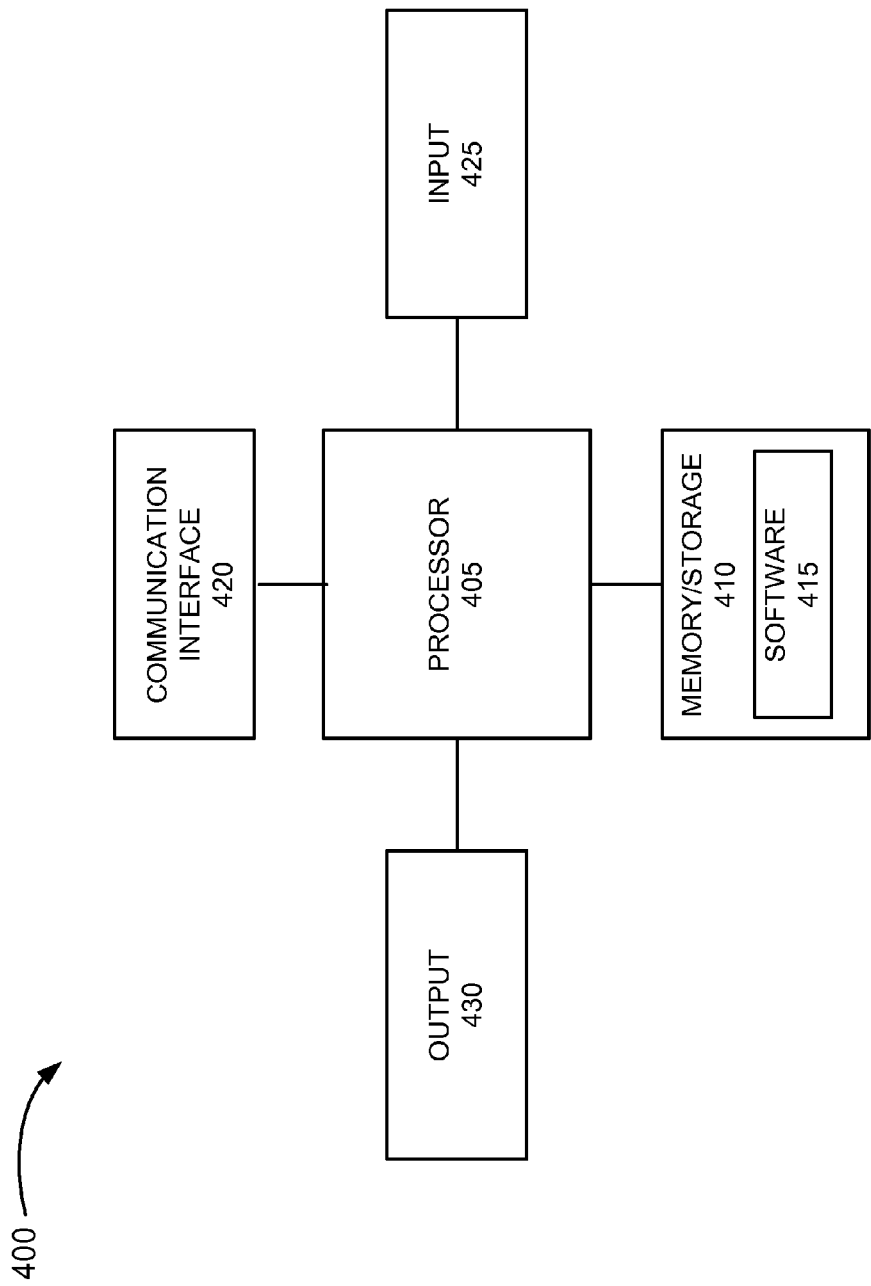
FIG. 4 is a diagram illustrating exemplary components of a device that may correspond to one or more of the devices depicted in the previous figures.

FIG. 4 is a diagram illustrating exemplary components of a device 400 that may correspond to one or more of the devices depicted in the figures. As illustrated, according to an exemplary embodiment, device 400 includes a processor 405, memory/storage 410 that stores software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include a drive for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. For example, network device 110 may include software 415 to perform security processes described herein. Additionally, for example, other devices may be implemented with software 415 to provide a function or a process, as described herein.

Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or read into memory/storage 410 from another device via communication interface 420. The instructions stored by memory/storage 410 may cause processor 405 to perform one or more processes described herein. Alternatively, for example, according to other implementations, device 400 may perform one or more processes described herein based on fixed function hardware and/or other well-known architectures.

Figure 5:
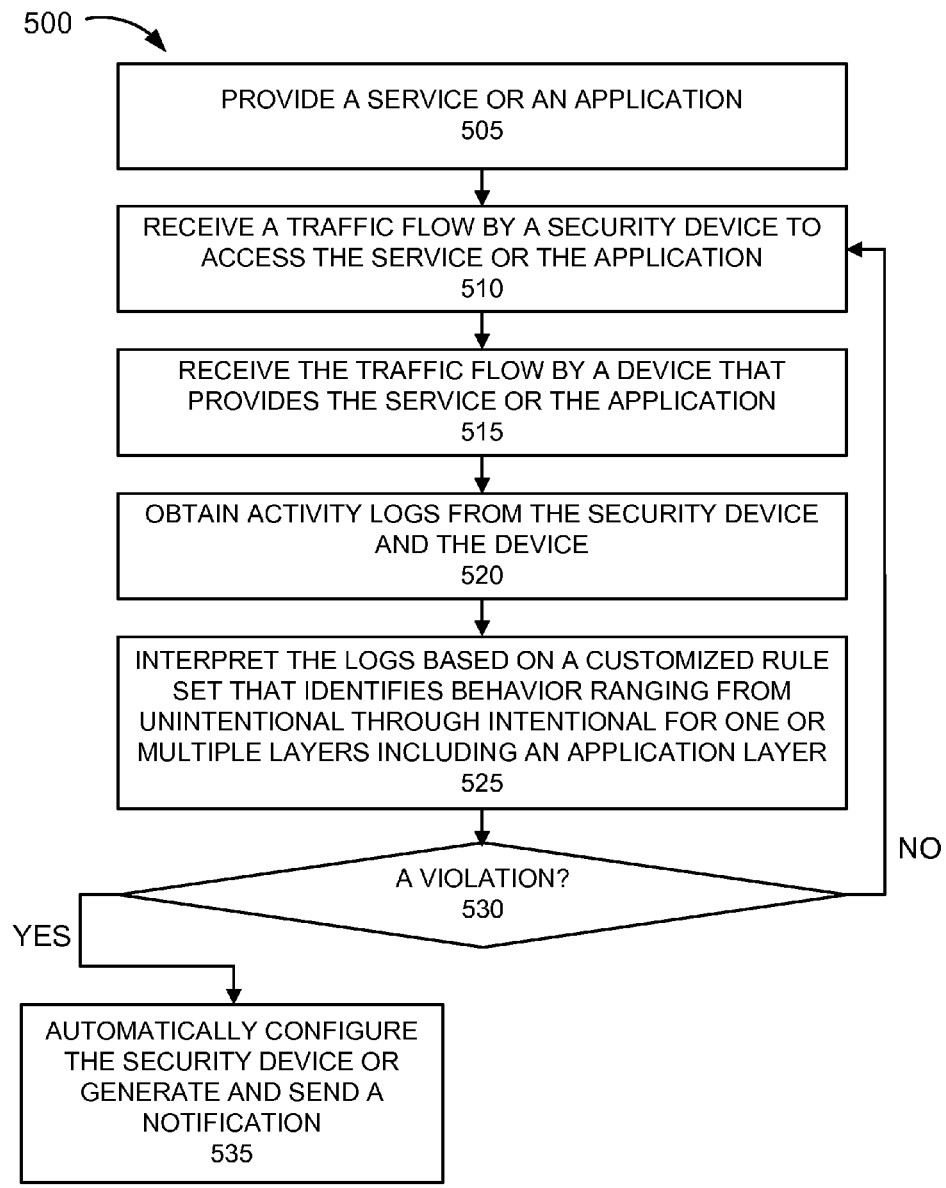
FIG. 5 is a flow diagram illustrating an exemplary process for providing network security.

FIG. 5 is a flow diagram illustrating an exemplary process for providing network security based on the customizable rule set. According to an exemplary embodiment, the customizable rule set identifies behavior ranging from unintentional or non-malicious behavior through intentional or malicious behavior at one or multiple communication layers including an application layer. According to an exemplary embodiment, network devices 110 perform process 500. For example, processor 405 may execute software 415 to perform the steps described.

Referring to FIG. 5, in block 505, a service or an application is provided. For example, a service provider provides a service or an application (e.g., a video conferencing service) that is accessible to users via a network security system (e.g., network security appliance 205 and analytics engine device 215).

In block 510, a traffic flow to access and use the service or the application is received by a security device. For example, a traffic flow that includes signaling and media components is received by network security appliance 205 to access and use the video conferencing service.

In block 515, the traffic flow is received by a device that provides the service or the application. For example, the traffic flow is received by one or multiple application/service-providing devices (e.g., conferencing bridge device 220, conferencing server device 225, communication manager device 235).

In block 520, activity logs are obtained from the security device and the device. For example, analytics engine device 215 obtains logs from network security appliance 205 and conferencing bridge device 220, conferencing server device 225, and communication manager device 235. The logs include information pertaining to the network activity resulting from the user using the service or the application provided. The logs include information pertaining to various communication layers (e.g., network, session, etc.) of the network activity including the application layer. By way of example, the logs include information pertaining to session event times, URIs, network addresses (source, destination, network address translation information, etc.), user device type, supported codecs, action(s) performed by the security device, and action(s) performed by one or multiple application/service-providing devices that provide the service or the application to the user.

In block 525, the logs are interpreted based on a customized rule set that identifies behavior ranging from unintentional or non-malicious behavior through intentional or malicious behavior for one or multiple communication layers including an application layer. For example, analytics engine device 215 interprets the logs based on the set of customized rules. The set of customized rules includes rules directed to identifying different types of behavior, as described herein. For example, the customized rules include rules pertaining to concurrent events (e.g., X-number of connections), per-time events (e.g., X-number of connections within an X-time period), entropy in addressing, aggregate repeat events (e.g., X-number of times during an X-period of time), Internet Protocol (IP) masking, time of day, null identity, and well-known identity.

In block 530, it is determined whether a violation exists. For example, analytics engine device 215 calculates a score in relation to the interpretation of the logs vis-à-vis one or multiple rules of the customized rules. The score is compared to a threshold score that indicates a particular behavior. If the score is equal to or above the threshold score, then analytics engine device 215 determines that a violation exists. If the score is below the threshold score, then analytics engine device 215 determines that a violation does not exist.

If it is determined that a violation exists (block 530-YES), then the security device is automatically configured and/or a notification is generated and transmitted (block 535). For example, analytics engine device 215 generates a notification and transmits the notification to a user (e.g., a network administrator), as previously described. Upon review of the notification by the network administrator, for example, analytics engine device 215 automatically updates network security appliance 205. Network security appliance 205 performs, for example, IP address blocking pertaining to an IP address(es) or range of IP addresses associated with the user of the service or the application.

If it is determined that a violation does not exist (block 530-NO), then process 500 continues. For example, process 500 continues until the user disconnects from the service or the application.

Although FIG. 5 illustrates an exemplary process 500, according to other embodiments, process 500 may include additional operations, fewer operations, and/or different operations than those illustrated in FIG. 5 as described herein. For example, when network security appliance 205 includes an entry in a blacklist to block an IP address(s) or range of IP addresses, access and use of the service or the application is prevented. Depending on the violation identified, the prevention of access and use of the service or the application may stem from a behavior (e.g., within a range from unintentional or non-malicious through intentional or malicious). Additionally, as previously described, network administrators may train the analytics engine device 215 based on operation in the field, user evaluation, and rule refinement.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, an embodiment described herein may be implemented as a non-transitory storage medium that stores data, information and/or instructions, such as a program, a data structure, a program module, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   receiving, by a security device, a traffic flow for use of a service;
   receiving, by one or more service-providing devices, the traffic flow;
   obtaining, by an analytics device, logs from the security device and the one or more service-providing devices, wherein the logs include information pertaining to traffic flow activity at an application layer associated with the service;
   storing, by the analytics device, rules that identify behavior ranging from unintentional behavior through intentional behavior for one or multiple communication layers including an application layer of a communication stack, wherein the unintentional behavior includes behavior that unnecessarily uses resources associated with the service;
   interpreting, by the analytics device, the logs based on one or more of the rules;
   determining, by the analytics device, whether a violation exists based on the interpreting; and
   generating a notification in response to determining that the violation exists.

2. The method of claim 1, further comprising:
   generating one or more entries of a blacklist in response to determining that the violation exists, and wherein the rules are application-specific to the service and the service includes a video conferencing service.

3. The method of claim 1, wherein the unintentional behavior includes behavior stemming from misconfiguration of user devices used by users of the service.

4. The method of claim 1, wherein the determining comprises:
   generating a score based on the interpreting; and
   comparing the score to a threshold value, and wherein the logs include real-time information pertaining to the traffic flow activity, wherein the threshold value correlates to a utilization of the resources.

5. The method of claim 1, wherein the rules include rules pertaining to concurrent events, per-time events, entropy in addressing, and aggregate repeat events.

6. The method of claim 1, further comprising:
   storing a blacklist that includes network addresses; and
   preventing access to the service based on the blacklist, wherein one or more of the network addresses pertain to a previous access of the service that was determined as a violation corresponding to unintentional behavior.

7. The method of claim 1, wherein the rules include rules pertaining to a time of day, a null identity, and well-known identity.

8. The method of claim 1, further comprising:
   transmitting the notification; and
   receiving, in response to the transmitting, one or more modifications to the rules.

9. A system comprising:
   a first device comprising:
   a first transceiver;
      a first memory to store instructions; and
      a first processor to execute the instructions to:
         obtain logs from a second device and one or more service-providing devices, wherein the logs include information pertaining to traffic flow activity at an application layer associated with a service;
         store rules that identify behavior ranging from unintentional behavior through intentional behavior for one or multiple communication layers including an application layer of a communication stack, wherein the unintentional behavior includes behavior that unnecessarily uses resources associated with the service;
         interpret the logs based on the rules;
         determine whether a violation exists based on the interpreting; and
         generate a notification that indicates the violation exists in response to a determination that the violation exists.

10. The system of claim 9, wherein the first processor to execute the instructions to:
    generate one or more entries of a blacklist in response to determining that the violation exists, and wherein the rules are application-specific toward the service.

11. The system of claim 9, wherein when determining whether a violation exists, the first processor to execute the instructions to:
    generate a score based on an interpretation of the logs based on the rules; and
    compare the score to a threshold value.

12. The system of claim 9, wherein the second device includes a firewall device comprising:
    a second transceiver;
       a second memory that stores instructions; and
       a second processor to execute the instructions to:
          store a blacklist that identifies network addresses associated with violations identified by the first device; and
          prevent access to the service based on the blacklist, wherein the first device does not receive traffic flow of users pertaining to use of the service.

13. The system of claim 12, wherein the notification includes information indicating one or more Internet Protocol addresses pertaining to the violation, a blocking recommendation, and the score or the threshold score reached.

14. The system of claim 9, wherein the second processor to execute the instructions to:
transmit one or more logs of the logs to the first device; and
receive one or more modifications to the rules.

15. The system of claim 9, wherein the rules include rules pertaining to concurrent events, per-time events, entropy in addressing, and aggregate repeat events.

16. The system of claim 9, wherein the unintentional behavior includes behavior stemming from misconfiguration of user devices used by users of the service.

17. A non-transitory storage medium that stores executable instructions, by a computational device, to:
obtain logs from a security device and one or more service-providing devices, wherein the logs include information pertaining to traffic flow activity at an application layer associated with a service;
store rules that identify behavior ranging from unintentional behavior through intentional behavior for one or multiple communication layers including an application layer of a communication stack, wherein the unintentional behavior includes behavior that unnecessarily uses resources associated with the service;
interpret the logs based on the rules;
determine whether a violation exists based on the interpreting; and
generate a notification that indicates the violation exists in response to a determination that the violation exists.

18. The non-transitory storage medium of claim 17, further storing executable instructions to:
generate a score based on an interpretation of the logs based on the rules; and
compare the score to a threshold value.

19. The non-transitory storage medium of claim 17, further storing executable instructions to:
update a blacklist stored by the security device.

20. The non-transitory storage medium of claim 17, wherein the rules include rules pertaining to concurrent events, per-time events, entropy in addressing, and aggregate repeat events pertaining to the service that includes video conferencing.

21. A method comprising:
obtaining logs from a security device and a service-providing device, wherein the logs include information pertaining to traffic flow activity at an application layer;
storing rules that identify behavior ranging from non-malicious behavior through malicious behavior for one or more communication layers including an application layer of a communication stack, wherein the non-malicious behavior includes behavior that unnecessarily uses resources associated with the service;
interpreting the logs based on the rules;
determining whether a violation exists based on the interpreting; and
generating a notification that indicates the violation exists in response to a determination that the violation exists.

22. The method of claim 21, wherein the determining comprises:
generating a score based on the interpreting; and
comparing the score to a threshold value, and wherein the logs include real-time information pertaining to the traffic flow activity.

23. The method of claim 21, wherein the rules include rules pertaining to concurrent events, per-time events, entropy in addressing, and aggregate repeat events.

24. The method of claim 21, further comprising:
using a timer and a counter for each log received; and
associating each log to at least one of a network address, a range of network addresses, a user identity, or a time window based on the using.

25. The method of claim 21, further comprising:
transmitting the notification to another device, wherein the notification includes a recommendation to block or to adjust Internet Protocol address routing or handling.

* * * * *